United States Patent [19]

Rutz et al.

[11] Patent Number: 5,161,674
[45] Date of Patent: Nov. 10, 1992

[54] TENTERING CHAIN WITH A CONTINUOUSLY ADJUSTABLE CHAIN PITCH FOR TREATING FILM WEBS SIMULTANEOUSLY IN TWO AXIAL DIRECTIONS

[75] Inventors: Andreas Rutz, Lindau; Rudolf Langer, Bodolz; Hubert Becher, Tettnang; Klaus Buttenbender, Friedrichshafen, all of Fed. Rep. of Germany

[73] Assignee: Lindauer Dornier Gesellschaft mbH, Lindau, Fed. Rep. of Germany

[21] Appl. No.: 614,516

[22] Filed: Nov. 14, 1990

[30] Foreign Application Priority Data

Nov. 15, 1989 [DE] Fed. Rep. of Germany ....... 3937855

[51] Int. Cl.⁵ .............................................. B65G 21/14
[52] U.S. Cl. ................................... 198/812; 198/851; 26/73
[58] Field of Search ................... 198/851, 812; 26/73, 26/91, 93

[56] References Cited

U.S. PATENT DOCUMENTS

| | | | |
|---|---|---|---|
| 2,142,003 | 12/1938 | Morgelin | 198/851 |
| 2,755,533 | 7/1956 | Miller | 26/73 |
| 3,174,617 | 3/1965 | Noffsinger | 198/851 |
| 3,491,402 | 1/1970 | Shindo et al. | 26/73 |
| 3,742,863 | 7/1973 | Rosenberger, Jr. | 198/851 X |
| 4,200,963 | 5/1980 | Kamfe et al. | 26/73 |
| 4,330,499 | 5/1982 | von und zu Aufsess et al. | 26/73 X |
| 4,614,011 | 9/1986 | Nicholas et al. | 26/73 |
| 4,890,365 | 1/1990 | Langer | |

*Primary Examiner*—D. Glenn Dayoan
*Attorney, Agent, or Firm*—W. G. Fasse

[57] ABSTRACT

A tentering chain is equipped with a mechanism for the stepless, continuous adjustment of the chain pitch which is the on-center spacing between two neighboring chain link journal bolts or pins. Such chains are used for this simultaneous, biaxial treatment of synthetic material films or webs. For this purpose, the chains carry tenter bodies with hooks or clamps for gripping the film edge. The tenter bodies carry guide rollers which engage guide rails along the travel path of the tentering chain. In order to dimension the tenter body with its gripping elements as small as possible, while still permitting a large shrinking or stretching of the film web, the chain link journal bolts or pins are mounted in the respective tenter body for an adjustment of the pin position in a direction of the chain travel. In all positions of the journal pin or pins these pins extend perpendicularly to the longitudinal direction of the chain. Two neighboring pins are interconnected by a coupling device which in turn is driven by a drive mechanism for adjusting the pitch by an adjustment lever operable, for example, by a control rail. A lock holds the pins in an adjusted position.

15 Claims, 8 Drawing Sheets

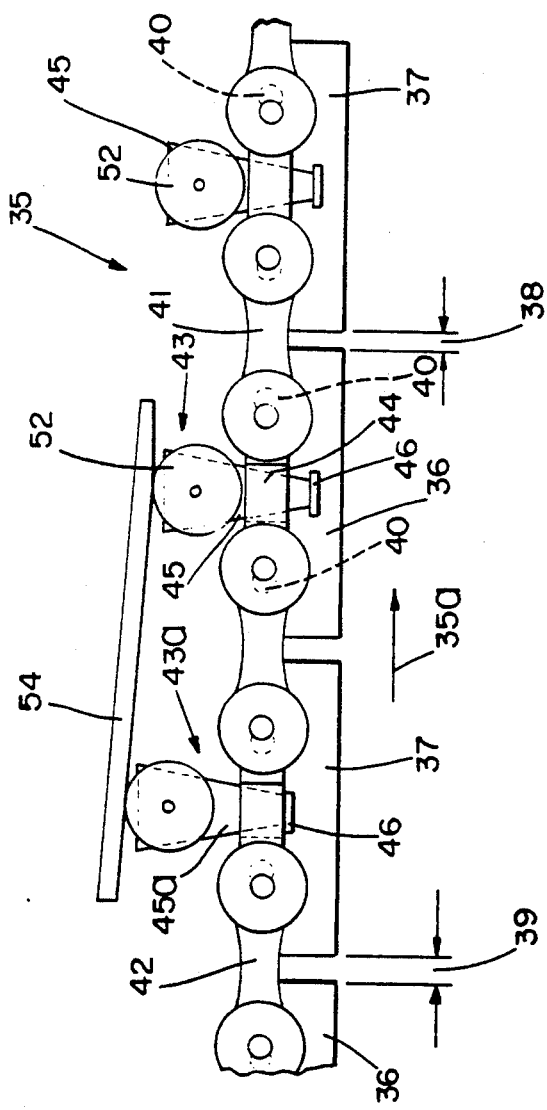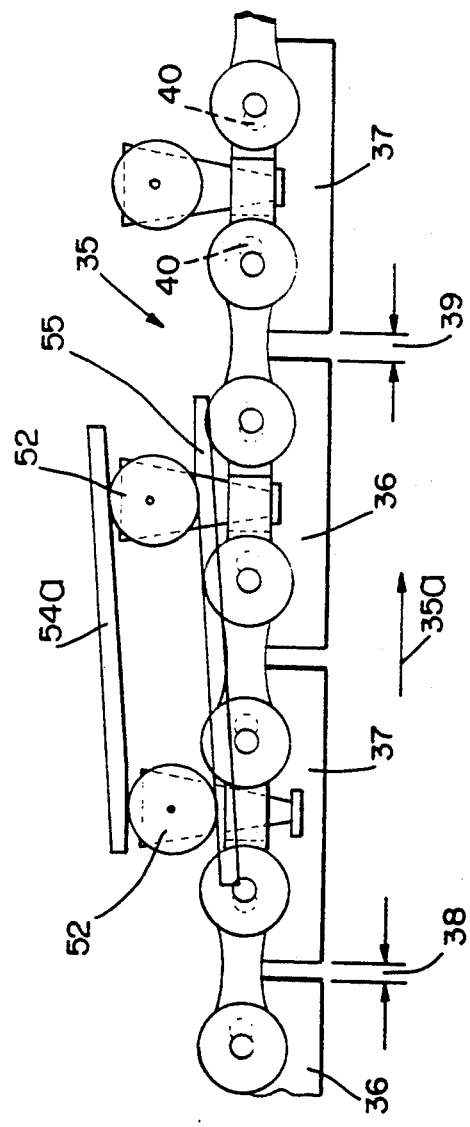

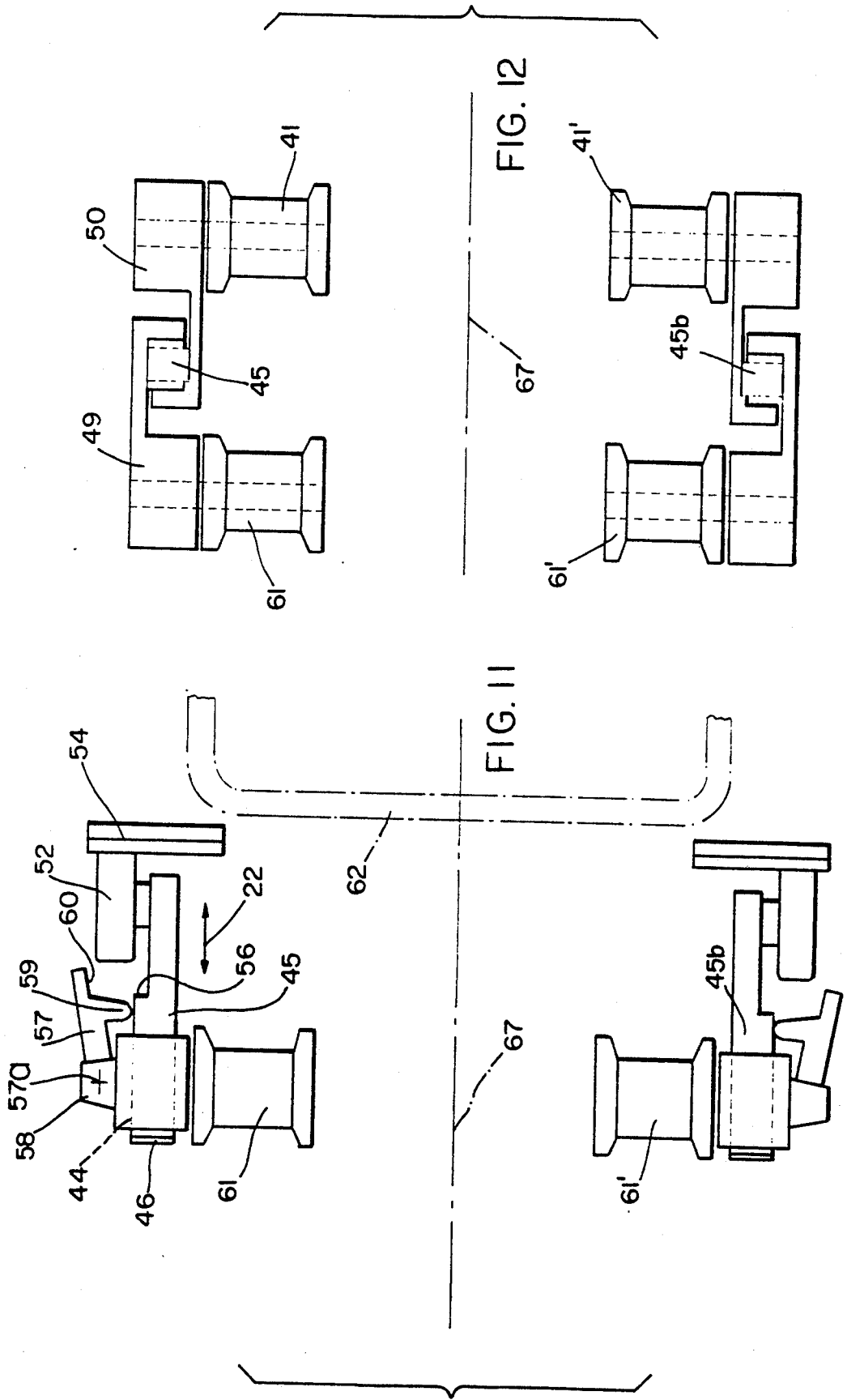

TENTERING CHAIN WITH A CONTINUOUSLY ADJUSTABLE CHAIN PITCH FOR TREATING FILM WEBS SIMULTANEOUSLY IN TWO AXIAL DIRECTIONS

CROSS REFERENCE TO RELATED APPLICATION

The present disclosure is related to our copending application U.S. Ser. No. 07/614,637, having the same title and filed on the same date with this application, namely, Nov. 14, 1990, and which resulted in U.S. Pat. No. 5,084,949, Issue Date: Feb. 4, 1992.

FIELD OF THE INVENTION

The invention relates to tentering chains having a continuously adjustable chain pitch Such tentering chains are used, for example, in systems for the simultaneous biaxial treatment of synthetic material films. For this purpose the chains carry tentering clamps or hooks for gripping the edges of a film.

BACKGROUND INFORMATION

In systems of this type the tentering chains carry tenter bodies which in turn support the above mentioned tentering hooks or clamps. Additionally, the tenter bodies carry guide rollers which run along guide surfaces of the guide rails of the system. The tenter bodies are pivoted to the chain links and it is desirable that the chain is adjustable. The term "chain pitch" in this context means the on-center spacing between two chain bolts that pivot or journal neighboring chain links and tenter bodies to each other.

A tentering chain as described above is known, for example, from U.S. Pat. No. 4,890,365 (Langer) corresponding to German Patent (DE) 3,716,603. The tentering chain disclosed in the just mentioned publications has a continuously adjustable pitch, whereby the adjustment is accomplished by means of bellcranks which interconnect neighboring chain links. Tilting of the bellcranks adjusts the chain pitch. However, such tilting of the bellcranks is limited, so that the chain pitch can only be changed within a narrow range of about 1.5% of the normal chain pitch. At the same time, however, the dimensions of the known tentering chain are quite substantial so that, for example, the pitch itself was 7.5 inches and it is difficult to make this pitch smaller in a conventional chain.

OBJECTS OF THE INVENTION

In view of the foregoing it is the aim of the invention to achieve the following objects singly or in combination:

to provide a tentering chain in which the individual chain components, such as the chain links and the tenter bodies can have smaller dimensions, and hence can be constructed more compact;

to construct tentering chains with a pitch smaller than 7.5 inches while simultaneously permitting an adjustment of the pitch within a substantially wider range for permitting shrinking factors up to 20% based on corresponding continuously adjustable pitch chains;

to use eccentric adjustment means for continuously changing the chain pitch in a wide range;

to combine the adjustment with an arresting mechanism so that once the desired pitch has been adjusted, the adjusted pitch can be fixed;

to construct the arresting or locking means in such a way that their activation and deactivation can be controlled by the guide rails of the system;

to construct the tentering chain in such a way that it can operate as a so-called push-pull chain; and to make the spacing between the gripping edge of a film to be held by the tentering chain and the chain pivot point smaller so that the tentering body, as well as the chain links can have smaller dimensions.

SUMMARY OF THE INVENTION

A tentering chain according to the invention is characterized in that at least one chain bolt or journal pin is mounted substantially vertically in its respective tenter body in such a way that the chain bolt or journal pin is adjustable substantially in the direction of the chain length and so that the two chain bolts or journal pins extending substantially vertically in a tenter body are interconnected by at least one coupling element which in turn is connected to a drive mechanism which can displace the coupling element relative to the tenter body to thereby change the on-center spacing or pitch between two neighboring chain bolts or journal pins. The drive mechanism is so arranged that it is controlled by the guide rail or rails of the tentering system. By interconnecting at least one chain bolt of two chain bolts or journal pins to the tentering body through a coupling element that can be adjusted, it is possible to adjust the position of the chain bolt or journal pins within the respective tentering body for the desired adjustment of the chain pitch. However, it is also possible to adjustably couple the two chain bolts of one chain link with an adjustable coupling mechanism to each other so that the on-center spacing between two chain bolts of a pair is adjustable.

The teaching of the invention is applicable to chains with a single run and to chains with more than one run. Different possibilities are disclosed for the construction of the drive mechanism for the coupling elements, the adjustment mechanism, and for the coupling elements themselves.

According to a first embodiment the coupling element comprises a standardized coupling body to which a bushing is secured. The bushing has a central longitudinal axis extending perpendicularly to the length of the chain and thus perpendicularly to the chain run direction. An eccentric bolt is rotatably mounted in the bushing. The excenter bolt in turn is effective on the respective chain link journal pin for moving the coupling element relative to the chain link journal pin in a direction of the length of the chain. For this purpose the eccentric adjustment bolt has end stubs rotatably mounted in the tenter body. Thus, by rotating the eccentric adjustment bolts, the coupling element is displaced in the length direction of the chain, whereby the two neighboring chain link journal pins are either pulled toward each other or pressed away from each other. For this purpose the coupling element is provided with an elongated hole extending in the length direction of the chain and the respective chain link journal pin is movably held and guided in this elongated hole. The adjustment length is determined by the length of the elongated hole. Each end of the journal pin is guided in a respective elongated hole of a shackle plate of the coupling element.

Instead of driving the adjustment by an eccentric bolt, it is possible to use a toothed rack and pinion drive for the adjustment. In this embodiment the coupling element also comprises two parallel shackling plates spaced from each other, but provided with gear teeth forming the toothed rack that cooperates with the gear teeth of a respective pinion. The pinion is rotatably mounted in the tentering body. By rotating the pinion the two shackling plates are displaced in unison relative to the journal pin in the longitudinal chain direction for adjusting the chain pitch.

In a third embodiment of the invention the adjustment mechanism comprises an adjustment wedge which engages a wedge-shaped recess formed in two parallel shackling plates or elements forming a coupling member between neighboring chain link journal pins. Depending on the extent to which the adjustment wedge reaches into the wedge-shaped recess, the pitch can be varied accordingly. In this third embodiment, the rotational adjustment movements of the eccentric bolt and of the adjustment drive pinion have been replaced by a linear adjustment movement of the adjusting wedge. This linear adjustment movement extends substantially perpendicularly to the chain run direction. The third embodiment has the advantage that the linear adjustment movement permits substantial adjustment ranges up to 20% of the normal pitch, whereby the respective shrinking factor is also within the range of about 1.5% to about 20%. The range of the shrinking factor does depend though on the dimensions of the adjustment mechanism and of the tentering chain components. The wedge movement is responsive to a cam follower action of a roller running along a control rail.

According to the invention all adjustment mechanisms must be arrested or locked in an adjusted position For this purpose a spring biased latching mechanism may be employed. However, cam operated latching mechanisms are also suitable For all latching mechanisms it is important that the locking and unlocking can be accomplished by the guide and adjustment rails of the tentering system.

The structural features of the present invention have the advantage that the spacing between the film edge and the journal axis of the tentering hook or clamp can be optimally small because the components of the tenter body can be substantially smaller than was possible in conventional systems. As a result, the same forces do not develop large torque moments which permits the smaller component dimensions, especially for the tenter body as compared to conventional tenter bodies. As a result, the present tentering chains are well suited for handling thin synthetic material films. Altogether the present chains are lighter than conventional chains and hence require less driving power.

Furthermore, all embodiments permit a pulling operation or a pushing operation of the chain. This is so because the above mentioned locking mechanism prevents an unintentional change in the chain pitch so that at all times a force and form-locking connection between the journal pins and the chain components is assured independently of the pitch adjustment and hence independently of the adjusted shrinking factor.

BRIEF DESCRIPTION OF THE DRAWINGS

In order that the invention may be clearly understood, it will now be described in more detail with reference to the accompanying drawings, wherein.

Figure 1:
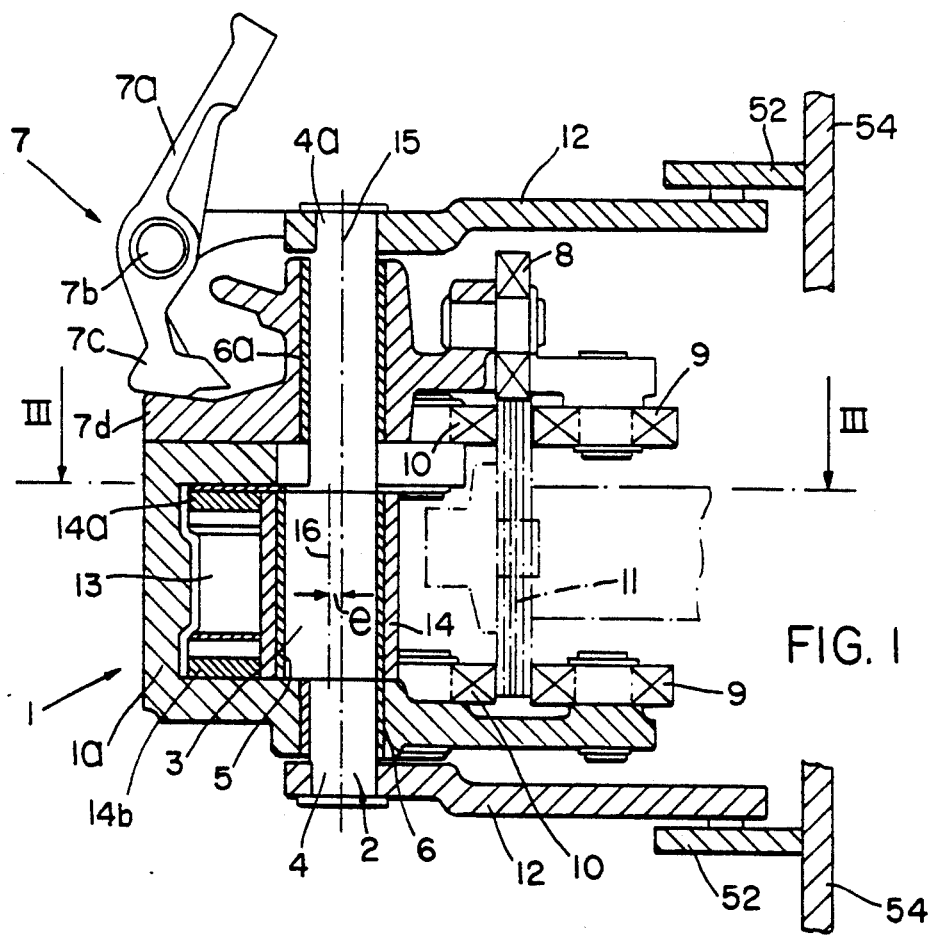
FIG. 1 is a sectional view along section line I13 I in FIG. 3 showing a tentering clamp according to the invention with its tentering body and a guide rail controlled locking mechanism having rollers engaging a guide rail for holding neighboring tenter bodies in any adjusted pitch position relative to each other.
Figure 2:
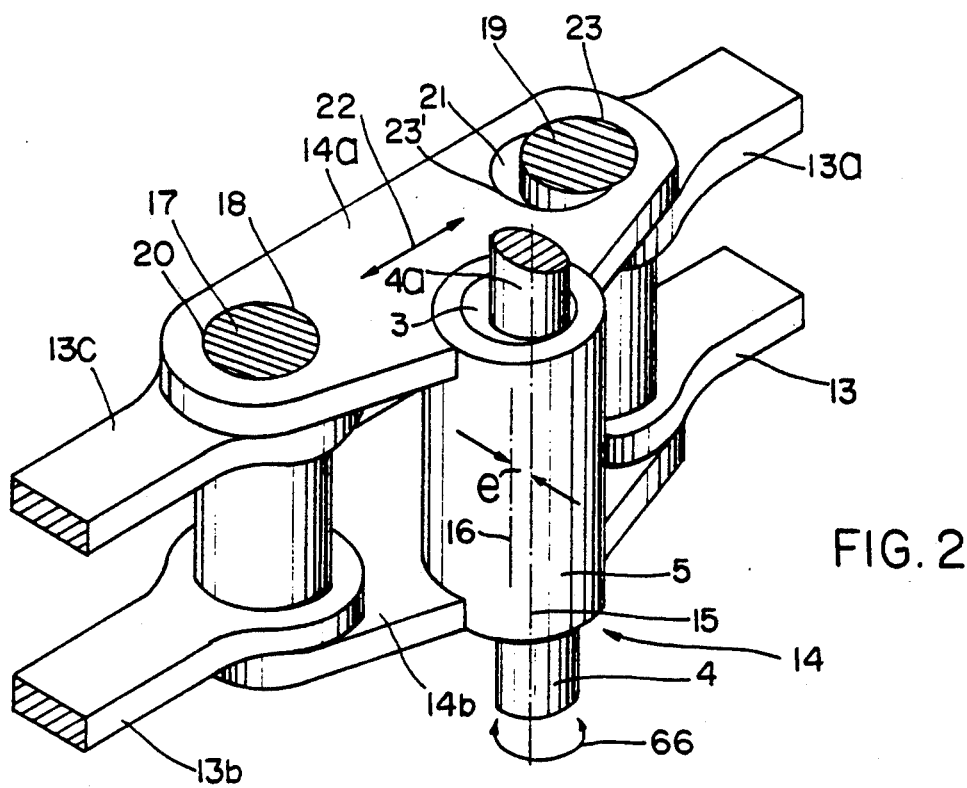
FIG. 2 is a perspective view of a first embodiment of a coupling element according to the invention, using an eccentric bolt for the adjustable coupling or pitch adjustment.
Figure 3:
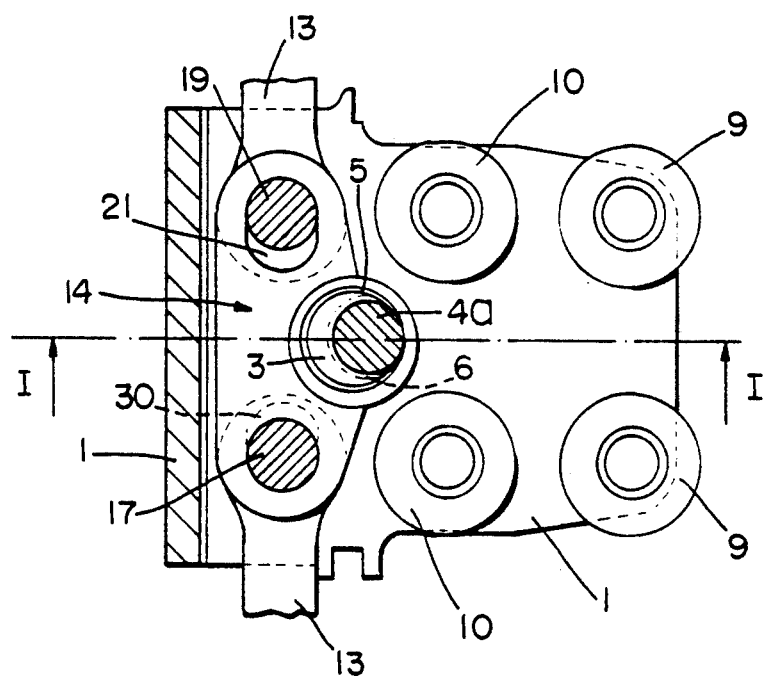
Figure 4:
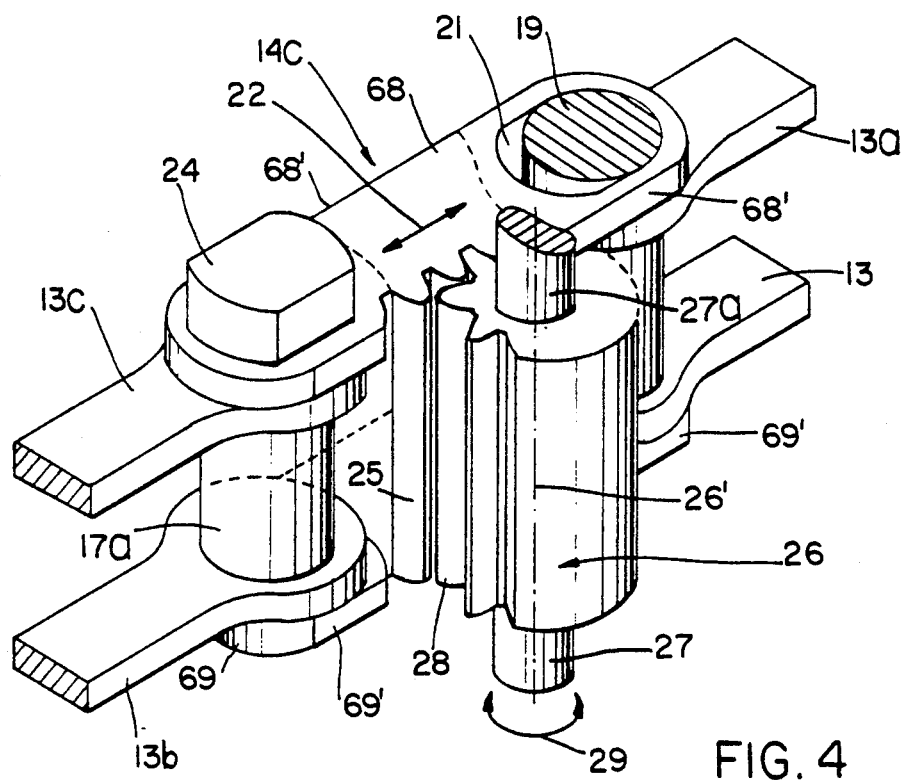
Figure 5:
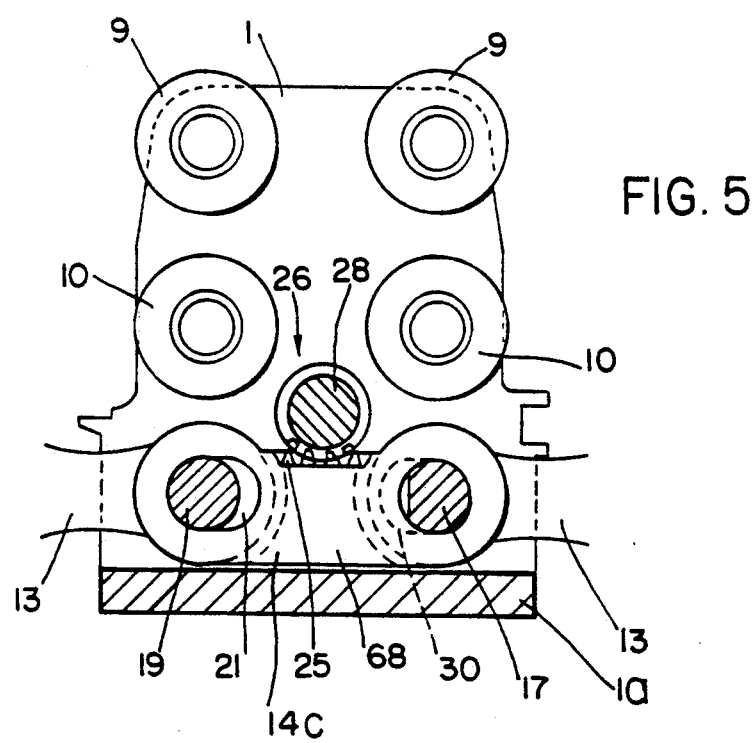
Figure 6:
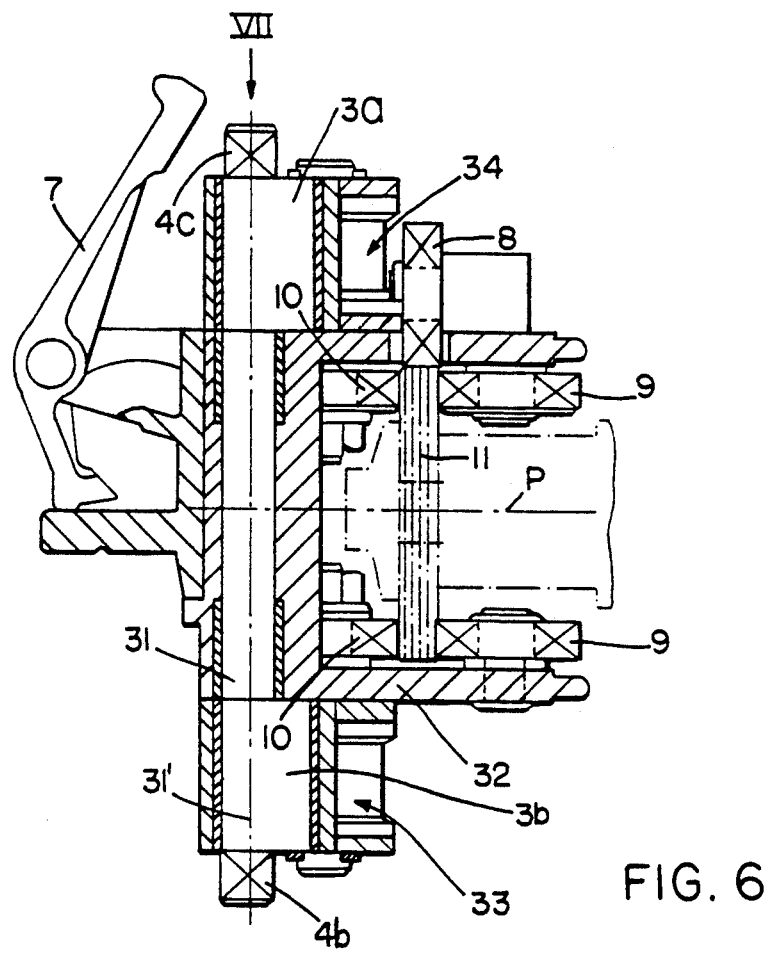
Figure 7:
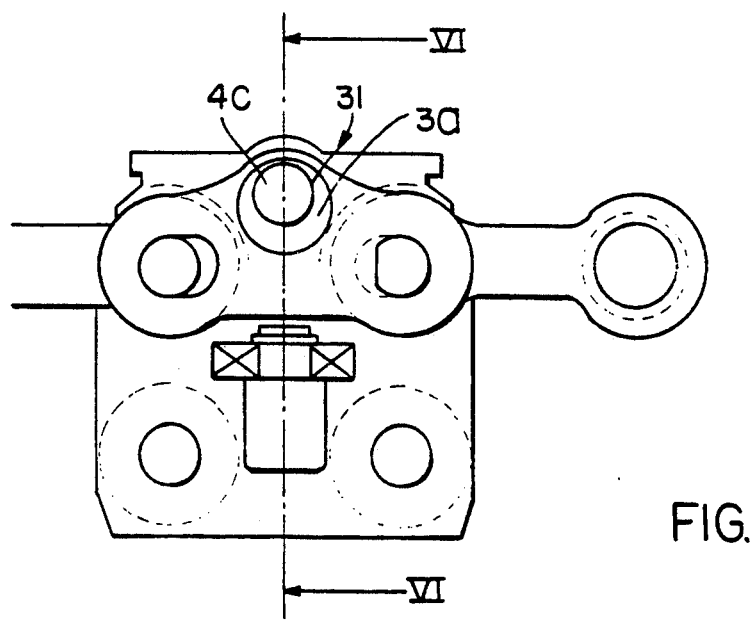
Figure 8:
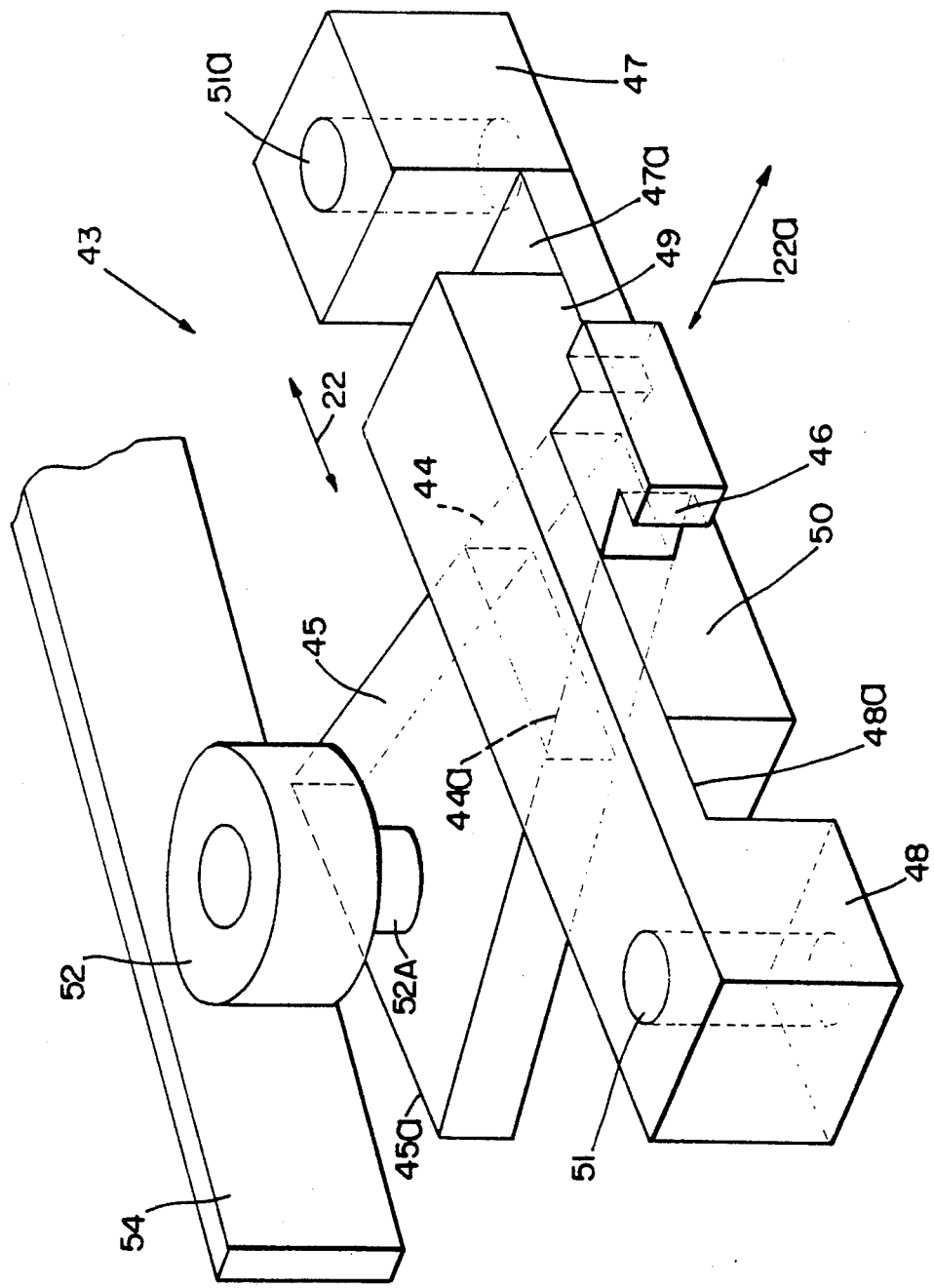
Figure 14:
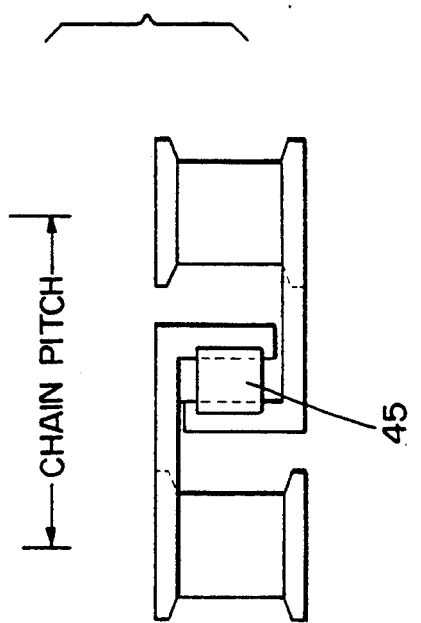
Figure 13:
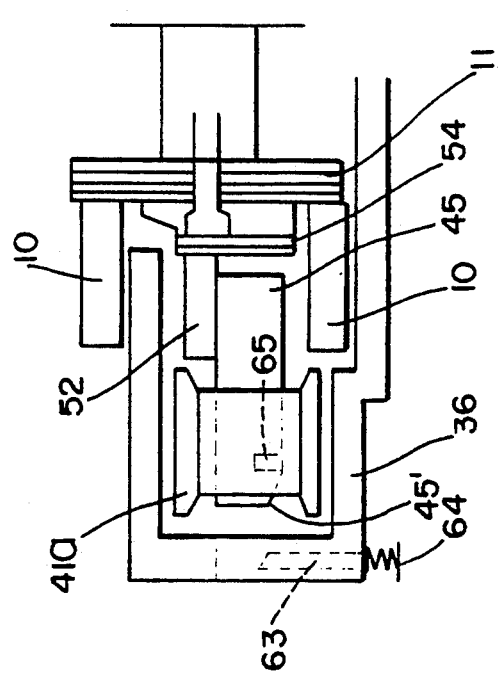

FIR 3 is a sectional view along section line III—III in FIG. 1;

FIG. 4 is a perspective view similar to that of FIG. 2, but showing another embodiment of a coupling element according to the invention in which the adjustment of the coupling is accomplished with a rack and pinion drive;

FIG. 5 is a sectional view similar to that of FIG. 3, but illustrating a tentering clamp using the coupling mechanism and drive of FIG. 4;

FIG. 6 shows a sectional view along section line VI—VI in FIG. 7, and illustrates a tentering clamp secured to a double-run chain;

FIG. 7 is a plan view in the direction of the arrow VII in FIG. 6;

FIG. 8 is a perspective view of another adjustable drive and coupling mechanism using a wedge as an adjustment drive element according to the invention;

FIG. 9 illustrates a top plan view of the mechanism of FIG. 8 cooperating with a guide rail controlling the wedging mechanism to reduce the spacing between two neighboring chain link journal pins;

FIG. 10 is a view similar to that of FIG. 9, but illustrating the operation of the wedging action for increasing the spacing between two chain link journal pins;

FIG. 11 shows a side view of a tentering chain comprising two chain runs and including a locking mechanism for holding the respective coupling mechanism in an adjusted position;

FIG. 12 is a front view of the double chain mechanism of FIG. 11;

FIG. 13 shows a side view of a single-run tentering chain equipped according to the invention with another locking mechanism; and FIG. 14 is a schematic simplified front view of the single-run tentering chain according to FIG. 13.

DETAILED DESCRIPTION OF PREFERRED EXAMPLE EMBODIMENTS AND OF THE BEST MODE OF THE INVENTION

Referring first to FIGS. 1, 2, and 3, the tenter body 1 comprises a box-shaped housing 1a. A gripper or clamping device 7 is secured to the upwardly facing wall of the housing 1a. A tentering hook or clamping element 7a is tiltable about a journal axis 7b and further details of its operation are disclosed in the above mentioned U.S. Pat. No. 4,890,365 (Langer). A bendable guide rail 11 formed, for example, of a plurality of leaf springs or tape springs, supports the tentering clamp with its tenter body 1a by means of guide rollers 8, 9, and 10, as is conventional.

A synthetic material film, not shown, is clamped by the clamping head 7c against the stationary housing section 7d.

The tenter body 1 has a through-bore in its housing 1a, 7d in which an eccentric adjustment bolt 2 is received. The eccentric bolt 2 comprises an eccentric section 3 between two circular end stubs 4, 4a. The circular end stub 4 is rotatably mounted in a bushing 6 in its bore in the lower housing wall of the tenter body housing 1a. The upper circular end stub 4a is rotatably mounted in a bearing bushing 6a which in turn is mounted in a respective bore in the housing section 7d. The housing section 7d of the clamping device 7 is secured to the upper wall of the housing 1a, thereby forming a cover for the tenter body 1. The housing sections 1a and 7d may, for example, be screwed together by screws not shown. The bushings 6 and 6a are axially aligned with each other, so that the end stubs 4 and 4a are rotatable about a rotational axis 15. The eccentric section 3 is rotatable about an axis 16 in the bushing 5, which forms a cross-brace between the shackle plates 14a, 14b of the coupling device 14. Due to the eccentricity of the eccentric section 3, the two rotational axes 15 and 16 are spaced from each other by the distance "e".

The bushing 5 and the chain link or shackle plates 14a and 14b are rigidly connected to each other to form the coupling device 14. The bushing 5 extends, as best seen in FIG. 2, perpendicularly to the length of the chain, thereby forming said cross-brace. The coupling device 14 driven by the eccentric section 3 is capable of changing the chain pitch, namely the on-center spacing between the chain bolt or journal pins 17 and 19. The adjustment takes place in the direction of the arrow 22 for increasing or decreasing the pitch. For this purpose, at least one of the bores for the journal pins 17, 19 in the chain link or shackle plates 14a, 14b is a longitudinal hole 21, while the other may be a substantially round hole 20 with a flattened edge 18 for preventing a rotation of the pin 17 in the coupling device 14. The adjustment is accomplished by rotating the eccentric bolt 2 in the direction of the arrow 66 shown in FIG. 2. When the end stubs 4, 4a are rotated in one or the other direction, the eccentric bolt 2 rotates about its axis 16. Otherwise, the stubs 4, 4a are fixed against movement in the housing 1a, 7d, thereby causing the eccentric section 3 in its bushing 6 to rotate, whereby the coupling device 14 is displaced in one or the other direction as shown by the double arrow 22 depending on the rotation direction of the eccentric bolt 2. The chain bolt or journal pin 17 is received in its bore 20 in the chain link plate 14a in a form-locking manner. This is accomplished by the above mentioned flattened portion 18 in the wall of the bore 20 to prevent a rotation of the journal pin 17. The other chain bolt or journal pin 19 extends into the elongated hole 21 so that there can be relative movement between the coupling device 14 and the journal pin 19 which interconnects the chain link elements 13 and 13a. This relative movement is in the longitudinal chain direction indicated by the arrow 22. When there is no tension on the chain, the journal pin 19 rests against the edge 23 of the elongated hole 21. After adjustment to the smallest possible pitch, the pin 19 will rest against the opposite edge 23'. The journal pin 19 can be locked in this minimum pitch position resting against the edge 23' by locking means to be described below. Incidentally, the relative motion between the coupling device 14 and the journal pin 19 is not a strictly linear motion, but a slightly curved motion in accordance with the eccentricity of the eccentric adjustment bolt section 3.

The adjustment of the position of the coupling device 14 relative to the journal pin 19 is a continuous adjustment which permits stopping at any position within the limits of the two end edges of the elongated hole 21. This continuous adjustment is accomplished with adjustment levers 12 shown in FIG. 1, whereby an adjustment lever is secured rigidly to each end stub 4, 4a. The free ends of the adjustment levers 12 carry rotatable rollers, not shown, which bear against guide or control rails for making the adjustment as the chain travels along these rails. Instead of using two adjustment levers 12, one may be sufficient. However, a more symmetric force transmission is accomplished with two symmetrically loaded adjustment levers 12 as shown.

FIGS. 4 and 5 illustrate another embodiment of an adjustment mechanism 14c. However, components which are the same as in the first embodiment also have the same reference numbers as in FIGS. 1, 2, and 3. The facing edge of the chain link plates 68, 69 are provided with gear teeth 25 to form a toothed rack which meshes with gear teeth 28 on a drive body 26 having end stubs 27 and 27a rotatably mounted in the housing sections 1a and 7d, not shown in FIG. 4. Adjustment levers 12 as shown in FIG. 1 are rigidly secured to the end stubs 27 and/or 27a to rotate the drive body 26 with its gears 28 in one of the directions of the arrow 29 for the adjustment of the chain pitch. The gear teeth 28 are arranged concentrically around the rotational axis 26' of the drive body 26. When the drive body 26 is rotated the adjustment is accomplished by the axial displacement of the chain link plates 68, 69 in the direction of the arrow 22, whereby a linear movement is achieved as compared to the slightly curved movement in the embodiment of FIGS. 1, 2, and 3.

The chain link journal pin 17a of FIG. 4 differs from the respective pin 17 in FIG. 2 in that the pin 17a has a slide head 24 which is received in a longitudinal guide recess 30 in the housing of the tenter body 1 as shown in FIG. 5. Thus, the movement in the direction of the arrow 22 is guided by the recess 30 in which the slide head 24 is received. Instead of providing slide heads 24 for the guiding of the adjustment movement in the tenter body, it is possible to simply guide surfaces of the link plates 68, 60, for example, surfaces 68' and 69' bearing against respective edges in the tenter body. The drive body 26 shown in FIG. 4 may be provided with the axially extending gear teeth 28 all around, or it may have the gear teeth only in a sector necessary for the adjustment within the range determined by the elongated hole 21.

FIGS. 6 and 7 illustrate an embodiment of the invention as applied to a chain with two runs 33 and 34. The above described adjustment and drive mechanisms are applicable to chains with one run, as well as to chains with two runs 33, 34. An eccentric adjustment bolt 31 having eccentric sections 3a and 3b passes through the tenter body 32 symmetrically relative to the central plane P. End stubs 4b and 4c are provided for connection to an adjustment lever not shown. By rotating the eccentric adjustment or drive bolt 31 about its longitudinal axis 31', an adjustment can be accomplished as described above with regard to the first embodiment, also in an embodiment with two tentering chain runs 33, 34. Instead of using an eccentric bolt 31 it is possible to also use a toothed rack and pinion drive in the embodiment of FIGS. 6 and 7. In both modifications the tenter body 32 with its guide rollers functions in the same manner as described above with reference to a tenter body 1 secured to a single run tentering chain.

FIGS. 8, 9, 10 show an adjustment mechanism with a wedge 45 that is moved linearly for a stepless, continuous adjustment of the chain pitch. Referring specifically to FIG. 8, the adjustment mechanism 43 comprises a coupling device with two coupling elements 47 and 48 which overlap each other and which are slideable relative to each other in the direction of the arrow 22 which, as in the other figures, is the adjustment direction. The adjustment wedge 45 moves in the direction of the arrow 22a perpendicularly to the adjustment motion represented by the arrow 22. The coupling element 48 has a slide body 49 in contact with a surface 47a of the coupling element 47. The coupling element 47 has a slide body 50 in contact with a surface 48a of the coupling element 48. A chain bolt or journal pin 51 extends through a respective bore in the coupling element 48. Another chain bolt or journal pin 51a extends through a respective bore in the coupling element 47. The tension normally applied to the tentering chain tends to move the two coupling elements 47 and 48 in opposite directions as indicated by the arrow 22.

The slide body 49 has a slanted surface 44 while the slide body 50 has a slanted surface 44a. These two surfaces 44 and 44a form a wedge-shaped recess in which the adjustment wedge 45 is received. The adjustment wedge 45 has a free end portion 45a that has mounted thereon a control roller 52 on an axle stub 52A. The control roller 52 runs along a guide or control rail 54 to be described in more detail below with reference to FIGS. 9 and 10.

Referring to FIGS. 9 and 10, the chain links 41, 42 of a tentering chain 35 carry neighboring tenter bodies 36, 37. The guide rail 54 extends at a slant toward the tentering chain 35 as viewed in the travel direction 35a for the purpose of controlling the extent to which the adjustment wedges 45, 45a reach into recesses formed by the slanting walls 44, 44a. Thus, at the left-hand side of FIG. 9, the wedge 45a is substantially withdrawn, except that its end foot 46 still contacts the coupling elements 47, 48. In this position of the adjustment wedge 45a, the spacing 39 between two neighboring tenter bodies 36, 37 is largest. On the other hand, when the guide or control rail 54 comes closer to the tentering chain, the wedge 45 is pressed to its full extent into the space between the two adjustable coupling elements 47, 48, whereby the spacing 38 between two neighboring tenter bodies becomes smallest. The position of the wedge between the two slanting walls 44, 44a is lockable by a locking mechanism shown in FIGS. 11 or 13 to be described below. In all instances, the engagement of the guide roller 52 with the guide surface of the rail 54 forces the respective wedge into the recess formed by the slanting walls 44, 44a when the chain 35 passes along the rail 54.

As the tentering chain 35 travels to the right, the spacing between the travel direction and the rail 54 becomes less and less, whereby the wedges 45, 45a are pressed into the wedge-shaped recess 44, 44a more and more. This movement of the wedge or wedges perpendicularly to the travel direction moves the coupling elements 47, 48 so as to reduce the on-center spacing between the journal pins 51, 51a. As a result, the spacing between neighboring tentering bodies 36, 37 is reduced as shown at 38. On the other hand, when the spacing between the travel direction and the rail 54 increases, the wedge 45a is pressed out of the recess formed by the walls 44, 44a because there is no self-locking effect between the wedge and the recess forming walls of the coupling elements 47, 48. The movement of the wedge out of its recess if there is no counterforce by the rail 54 against the roller 52, is caused by the tension load applied to the chain as the chain travels along its path.

FIG. 10 shows an embodiment in which the back and forth movement of the wedge is controlled by two rails 54a and 55 which slant away from the tentering chain 35. However, the effect is the same, except that the smaller spacing 38 happens first, and the larger spacing 39 happens next when the spacing between the travel direction and the two rails 54a and 55 increases. The rail 55 makes sure that the wedge is moved out again. In other words, the rail 54a assures the shrinking by the minimizing of the spacing between neighboring chain links or rather neighboring tenter bodies while the second control rail 55 assures the stretching operation by increasing the spacing between neighboring tentering bodies 36, 37.

Rather than moving the wedge 45 back and forth as described above, it is also possible to provide two wedge sections hinged to each other at the narrower end and to drive these two wedge sections toward and away from each other. The effect of adjusting the pitch would be the same.

Incidentally, the above mentioned end foot 46 of the wedge 45 makes sure that the wedge cannot be completely withdrawn from the recess 44, 44a. In order to permit the above described adjustment, the hinging pins of the chain links must be movable in elongated holes shown at 40 in FIGS. 9 and 10. These elongated holes 40 provide the respective guiding in the longitudinal direction 35a. The wedging action provides for a continuous, stepless adjustment of the pitch just as the eccentric adjusting device and the toothed rack and pinion device.

FIGS. 11 to 14 illustrate different types of locking mechanisms for arresting the adjustment device in an adjusted position. These arresting mechanisms are suitable for all the three types of adjustment devices as described with reference to FIGS. 1 to 10.

FIGS. 11 and 12 show a latch 57 for locking the wedge 45 in a position in which the two coupling elements 47 and 48 are adjusted to a desired pitch. As shown, the latch 57 is illustrated in the unlocked condition. The latch 57 is pivoted at 57a to a mounting block 58 arranged, for example, on the coupling element 48. The wedge 45 is provided with a shoulder 56 against which the latch hook 59 will rest, for example, under the force of a latch locking biasing spring, not shown, but arranged in the mounting block 58. Once the latch hook 59 engages the shoulder 56, the wedge 45 cannot move out of the recess 44, 44a. The unlocking of the latch 57 is accomplished by a control rail not shown, which is so positioned that a surface 60 of the latch 57 can run up the rail, whereby the latch 57 is lifted to disengage the shoulder 56. It is an advantage of the arresting mechanism that in the arrested state loads are not transmitted through the control or guide roller 52 to the adjustment mechanism. Thus, the guide or control rails 54 need to be positioned only where a shrinking or stretching is supposed to be applied to the film. Similarly, the control rail which engages the surface 60 will also only be located where it is needed.

When the latch 57 is engaged, there is a form-locking coupling between the adjustment mechanism and a guide rail carrier 62 only shown symbolically with dashed lines in FIG. 11. The latching also relieves the rollers 52 from loads during portions of the chain travel where no stretching or shrinking is intended. This assures a safe operation and reduces wear and tear resulting in a prolonged operational life of the system. FIG. 12 shows the illustration of FIG. 11 rotated by 90° to further show the use of two chain runs 61, 61'. Rollers 41 are part of the chain run 61. Rollers 41' are part of the chain run 61'. The upper and lower chain runs are arranged mirror-symmetrically relative to a central symmetry plane 67. Each coupling device has its own adjustment wedge 45, 45b as shown in FIGS. 11 and 12. The locking mechanisms are also identical for each chain run.

FIGS. 13 and 14 illustrate a single run chain with chain links 41a, the pitch of which is also adjustable by a wedge 45 which is provided with a recess 65 in which a locking pin 63 biased by a spring 64 is engageable to lock the wedge 45 in a coupling element spreading position when the wedge 45 has traveled far enough to the left for the pin 63 to be biased into the recess 65. For this purpose the wedge 45 has a downwardly facing ramp 45' which engages a similar ramp at the tip of the pin 63 until the pin 63 moves into the recess 65, whereby the wedge 45 is arrested to hold the adjusted position of the chain pitch shown in FIG. 14.

The withdrawal of the locking pin 63 from the recess 65 is also accomplished by an unlocking mechanism comprising a cam follower member or roller connected to the pin 63 and engaged by a guide or control rail not shown, but positioned along the chain path where disengagement of the pin 63 from the recess 65 is necessary. As in the latch locking mechanism described above, the locking pin 63 also has the advantage that it provides a form-locking connection between the tenter body 36 and the wedge 45 to thereby relieve the follower or control roller 52 from any loads as long as the form-locking engagement is maintained.

All of the embodiments shown and described have the advantage that the chain pitch can be adjusted within a substantial range from normal chain pitch which is, for example, the minimum chain pitch to a 20% larger chain pitch or vice versa.

Referring again to FIG. 1, the control roller 52 and the control rail 54 of FIG. 8, are also shown in FIG. 1 for locking all the eccentric bolts 2 with their respective eccentric sections 3 in an adjusted position. Even though the hole 21 is elongated, the form-locking of all the bolts 19 against the opposite edge 23' is assured because all the tenter bodies are held in the adjusted position simultaneously by their control rollers 52 bearing against the control rail or rails 54. This locking of the tenter bodies in an adjusted position is a continuous adjustment because all the hinging bolts 19 can be held in the two end positions defined by the elongated hole 21 and in any position between these end positions depending on the angle of inclination of the control rail or rails 54.

In the embodiment of FIG. 4, it is possible to achieve the locking by making the meshing gear teeth 25, 28 self-locking or by arresting the adjusting device 26 in an adjusted position. The shackle plates 68, 69 in FIG. 4 could be a single solid body with projecting end sections provided with axially aligned holes through which the ends of the hinging bolts 17a, 19 extend.

Although the invention has been described with reference to specific example embodiments it will be appreciated that it is intended to cover all modifications and equivalents within the scope of the appended claims.

What we claim is:

1. A tentering chain for the simultaneous biaxial treatment of synthetic material films, comprising tenter bodies including film holding means for gripping an edge of said film, chain links for interconnecting neighboring tenter bodies in a journalling manner, two journal pins and means for mounting said two journal pins in each tenter body in a substantially vertical position when said tenter body is in an operating position, at least one of said mounting means permitting a position adjustment of the respective journal pin substantially in a direction of a longitudinal chain advance while said journal pins maintain said substantially vertical position, whereby the respective journal pins extend in all positions substantially vertically and perpendicularly to the direction of chain advance, position adjustable coupling means interconnecting said journal pins, drive means for adjusting the position of said coupling means, and means for operating said drive means for position adjusting a chain pitch defined as an on-center spacing between two neighboring journal pins.

2. The tentering chain of claim 1, wherein said coupling means comprise two shackle plates mounted in said tenter body, said shackle plates extending in parallel to each other and with a defined spacing from each other, each shackle plate having two holes through which the respective journal pin extends, at least one of said holes being an elongated hole (21) for said pitch adjusting, and a cross shackle (5) rigidly interconnecting the two parallel shackle plates.

3. The tentering chain of claim 2, wherein one chain link journal pin (17) is operatively secured in two axially aligned holes of said shackle plates, and wherein the other journal pin (19) of a pair is supported in said elongated holes of said two shackle plates.

4. The tentering chain of claim 1, wherein said drive means comprise an adjustment bolt with at least one eccentric section rotatably mounted in said tenter body, and wherein said means for operating comprise an adjustment lever rigidly secured to at least one end of said adjustment bolt for rotating said adjustment bolt for said pitch adjusting.

5. The tentering chain of claim 4, wherein said coupling means comprise two shackle plates mounted in said tenter body, wherein said drive means comprises a bushing (5) forming a cross-brace between said two shackle plates, wherein said eccentric section of said adjustment bolt is received in said bushing, and wherein end sections of said adjustment bolt are rotatably supported in said tenter body.

6. The tentering chain of claim 1, wherein said drive means comprise a toothed rack and pinion drive and wherein said means for operating comprise means for rotating said pinion for adjusting said chain pitch.

7. The tentering chain of claim 6, wherein said toothed rack and pinion drive comprises gear teeth along one side of said position adjustable coupling means interconnecting said two journal pins, and a pinion provided with gear teeth at least on one side sufficient for meshing with said gear teeth extending along one side of said coupling means.

8. The tentering chain of claim 7, wherein said pinion (26) is rotatably mounted in said tenter body.

9. The tentering chain of claim 1, wherein said drive means comprise a linear motion pitch adjustment mechanism, and wherein said means for operating comprise means for linearly moving said pitch adjustment mechanism for adjusting said chain pitch.

10. The tentering chain according to claim 9, wherein said linear motion pitch adjustment mechanism comprises linear drive means including a wedging mechanism and wherein said coupling means comprise two coupling elements which are slideable relative to each other in the longitudinal chain direction in response to movement of said wedging mechanism perpendicularly to a chain advance direction into and out of a wedge-shaped recess (44, 44a) formed by said coupling elements (47, 48).

11. The tentering chain of claim 10, wherein each of said coupling elements has a U-configuration having U-legs arranged so that a leg of one U-configuration reaches between the legs of the other U-configuration, and wherein said U-legs facing each other have slanted surfaces to form said wedge-shaped recess extending in a direction substantially perpendicularly to an adjustment direction (22).

12. The tentering chain of claim 11, wherein said wedging mechanism comprises a wedge and a control roller mounted on said wedge, and wherein said means for operating comprise at least one adjustment rail cooperating with said control roller for moving said wedge into said wedge-shaped recess.

13. The tentering chain of claim 1, further comprising locking means for arresting said journal pins in an adjusted position relative to each other.

14. The tentering chain of claim 13, wherein said locking means comprise a locking member for holding an adjusted position.

15. The tentering chain of claim 1, wherein said means for operating said drive means comprise control roller means for holding an adjusted position, control rail means engaging said control roller means, and means (52A) mounting said control roller means (52) to said means (45) for operating, whereby said control roller means (52) in cooperation with said control rail means (54) perform a pitch adjustment function and an adjusted pitch locking function depending on an angular position of said control rail means relative to a chain travel direction.

* * * * *